United States Patent
Mahnkopf

(10) Patent No.: US 9,845,086 B2
(45) Date of Patent: Dec. 19, 2017

(54) BRAKE BOOSTER AND METHOD FOR OPERATING A BRAKE BOOSTER

(75) Inventor: Dirk Mahnkopf, Eglosheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 579 days.

(21) Appl. No.: 13/880,434

(22) PCT Filed: Sep. 5, 2011

(86) PCT No.: PCT/EP2011/065251
§ 371 (c)(1),
(2), (4) Date: Jun. 25, 2013

(87) PCT Pub. No.: WO2012/059260
PCT Pub. Date: May 10, 2012

(65) Prior Publication Data
US 2013/0269337 A1    Oct. 17, 2013

(30) Foreign Application Priority Data
Nov. 2, 2010   (DE) .................. 10 2010 043 203

(51) Int. Cl.
*B60T 13/58*    (2006.01)
*B60T 7/04*     (2006.01)
(Continued)

(52) U.S. Cl.
CPC .............. *B60T 13/58* (2013.01); *B60T 7/042* (2013.01); *B60T 7/085* (2013.01); *B60T 7/12* (2013.01);
(Continued)

(58) Field of Classification Search
CPC ............... B60T 7/02; B60T 7/04; B60T 7/042
See application file for complete search history.

(56) References Cited

U.S. PATENT DOCUMENTS 3,751,919 A * 8/1973 Ron ................. B60T 13/162
60/553
6,269,731 B1 * 8/2001 Gautier ............. B60T 8/3275
91/369.2

(Continued)

FOREIGN PATENT DOCUMENTS

CN    101506019    8/2009
DE    197 36 997   3/1999

(Continued)

OTHER PUBLICATIONS

International Search Report, dated Dec. 13, 2011, issued in corresponding PCT Application No. PCT/EP2011/065251.

*Primary Examiner* — Thomas E Lazo
*Assistant Examiner* — Richard Drake
(74) *Attorney, Agent, or Firm* — Norton Rose Fulbright US LLP; Gerard Messina

(57) ABSTRACT

A brake booster includes an input element actuatable by a driver, an actuator for generating a support force, an output element to which an input or support force may be applied and via which an actuating force may be applied to a piston of a brake master cylinder, and a force transmission unit having elastic properties, situated between the input element and the actuator, and the output element, and transmitting the input and/or support forces to the output element. An air gap, which in idle mode is smaller or larger than a desired air gap, is provided between the input element and the force transmission unit. A method for operating the brake booster includes generating a support force prior to a braking intent to be anticipated or immediately after detection of a braking intent, in a time span before or immediately after detection of an actuation of the input element.

4 Claims, 2 Drawing Sheets

(51) Int. Cl.
 *B60T 7/08* (2006.01)
 *B60T 7/12* (2006.01)
 *B60T 8/44* (2006.01)
 *B60T 13/66* (2006.01)
 *B60T 13/74* (2006.01)
 *B60T 17/22* (2006.01)

(52) U.S. Cl.
 CPC ............ *B60T 8/441* (2013.01); *B60T 13/662* (2013.01); *B60T 13/745* (2013.01); *B60T 17/22* (2013.01); *B60T 2201/12* (2013.01)

(56) References Cited

U.S. PATENT DOCUMENTS

| | | | | |
|---|---|---|---|---|
| 8,874,343 | B2 * | 10/2014 | Anderson | B60T 13/745 303/114.3 |
| 2005/0253450 | A1 * | 11/2005 | Giering | B60T 7/042 303/115.1 |
| 2006/0163941 | A1 * | 7/2006 | Von Hayn | B60T 7/042 303/155 |
| 2012/0265417 | A1 * | 10/2012 | Vollert | B60T 13/745 701/70 |

FOREIGN PATENT DOCUMENTS

| | | |
|---|---|---|
| DE | 10303686 | 12/2003 |
| DE | 102008051316 | 2/2010 |
| JP | 2006-273214 | 10/2006 |
| WO | WO 2009/083216 | 7/2009 |
| WO | WO 2010/069832 | 6/2010 |

* cited by examiner

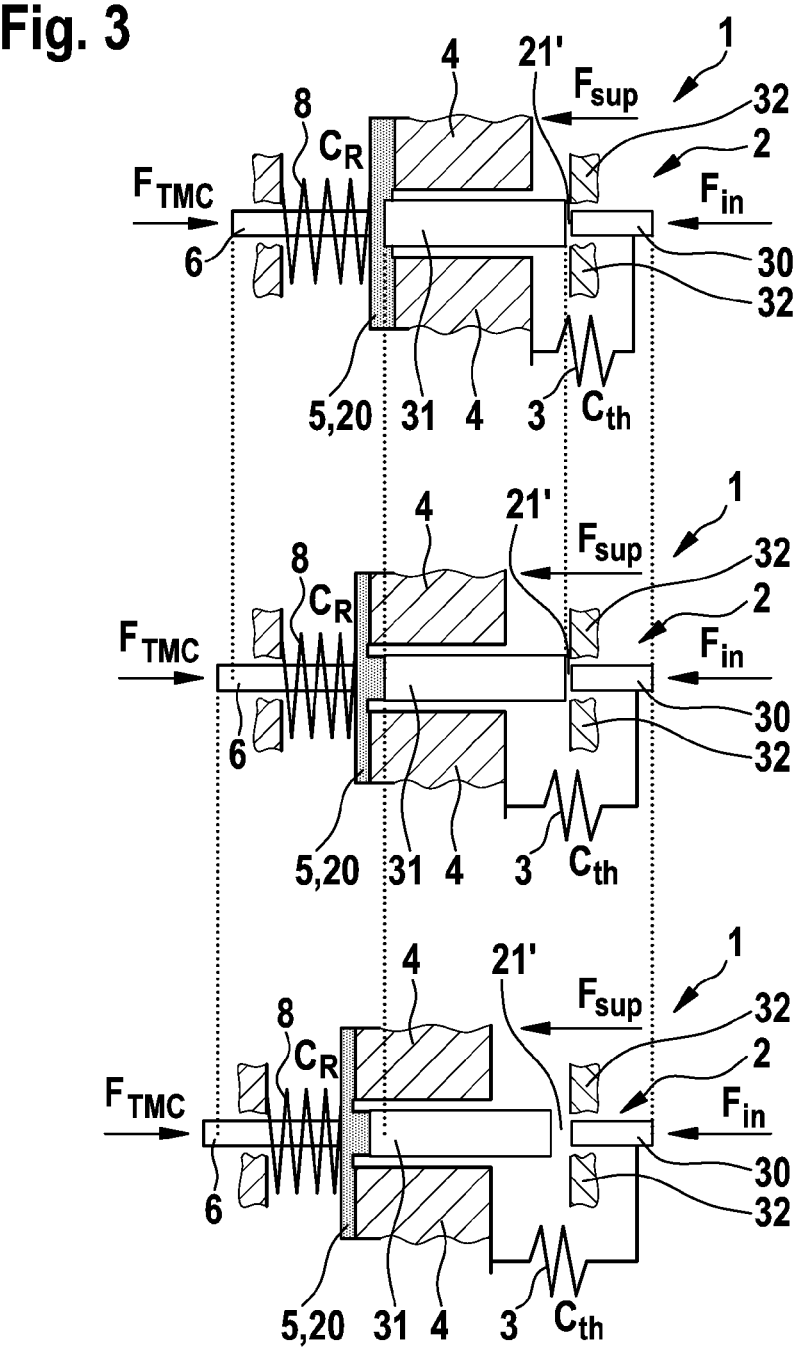

US 9,845,086 B2

BRAKE BOOSTER AND METHOD FOR OPERATING A BRAKE BOOSTER

CROSS-REFERENCE TO RELATED APPLICATIONS

The present application is the national stage entry of International Patent Application No. PCT/EP2011/065251, filed on Sep. 5, 2011, which claims priority to Application No. DE 10 2010 043 203.2, filed in the Federal Republic of Germany on Nov. 2, 2010.

FIELD OF INVENTION

The present invention relates to a brake booster and a method for operating a brake booster.

BACKGROUND INFORMATION

Brake boosters having the so-called jump-in function have been known for a long time. Here, an air gap is provided between an input element and a force transmission element of the brake booster. This air gap has the effect that the driver, upon actuation of the input element, initially does not have to press against the force transmission unit, but may move it with a low level of force. The control or regulation of the actuator force takes place in this area as a function of the travel of the input element at virtually constant input force. The actuating force is produced in this area primarily by an actuator of the brake booster.

In vehicles having conventional disk brakes, in the unbraked operating state, i.e., when the brake pedal is not actuated, energy losses in the form of a residual braking torque often occur, since the brake pads rub against the brake disk. Such rubbing may be caused, for example, by disk knocking and/or in many cases by incorrect pad return and the correct clearing not being maintained.

In order to save energy, disk brakes have therefore been developed in which the brake in the unbraked state is in a so-called zero drag position, so that no rubbing occurs between the brake pads and the brake disk. An appropriately designed brake caliper is often referred to as a zero drag caliper.

A disadvantage with such braking systems, however, is that after the brake pedal is released the brake pads often retract a long way from the brake disk, so that when the brake actuating element is actuated there is increased free or dead travel compared to conventional braking systems. Such additional free or dead travel, however, is undesirable and should therefore be avoided or compensated for. In this connection it should be pointed out that such increased free or dead travel may also result from the design of the system irrespective of whether or not zero drag calipers are used.

Compensation for such undesirable free or dead travel has previously been possible only through the use of so-called non-muscular-energy braking systems, in which the energy necessary for generating the braking force is generated by one or multiple energy supply devices, but not by the physical effort of the driver.

SUMMARY

A brake booster according to the present invention includes an input element which is actuatable by a driver, an actuator for generating a support force, an output element to which an input force or the support force may be applied with the aid of the input element and/or the actuator and via which an actuating force may be applied to a piston of a brake master cylinder, and a force transmission unit having elastic properties which is situated between the input element and the actuator on the one hand and the output element on the other hand and transmits the input force and/or the support force to the output element. According to the present invention, an air gap, which in the idle mode is smaller or larger than a desired air gap at the beginning of a braking operation, is provided between the input element and the force transmission element.

Another brake booster according to the present invention includes an input element which is actuatable by a driver, an actuator for generating a support force, an output element to which an input force or the support force may be applied with the aid of the input element and/or the actuator and via which an actuating force may be applied to a piston of a brake master cylinder, and a force transmission unit having elastic properties which is situated between the input element and the actuator on the one hand and the output element on the other hand and transmits the input force and/or the support force to the output element. According to the present invention, the input element has in this case a first subcomponent which is actuatable by the driver for generating the input force and, separate from it, a second subcomponent for transmitting the input force to the force transmission unit. Here, an air gap, which in the idle mode is smaller or larger than a desired air gap at the beginning of a braking operation, is provided between the first subcomponent and the second subcomponent of the input element.

Finally, the present invention provides a method for operating a brake booster according to the present invention, a support force being generated by the actuator prior to a braking intent to be anticipated or immediately after detection of a braking intent in a time span prior to or immediately after detection of an actuation of the input element.

In order to implement a jump-in function, many brake boosters have an air gap between the input element and the force transmission unit or between two subcomponents of the input element. The size of the air gap defines the size of the so-called jump-in, i.e., that force or that pressure at which the braking system transfers from a non-muscular-energy mode to an energy-assisted mode. The present invention is based on the underlying idea of designing a brake booster, which has such an air gap to implement a jump-in function, in such a way that undesirable free or dead travel in the braking system are compensated for without noticeable impact on the feel of the pedal, for example in the form of a shift of the brake actuating element. This is achieved according to the present invention in that the air gap is set during the manufacture or installation, for example, in such a way that in the idle mode it is smaller or larger than a desired air gap at the beginning of a braking operation. Now, if prior to a braking intent to be anticipated or immediately after detection of a braking intent, in a time span prior to or immediately after detection of an actuation of the input element, a support force is generated by the actuator, then a predefined travel at the output of the brake booster and thus at the piston of the brake master cylinder may be overridden by appropriately dimensioning the generated support force. Since in this time span, however, there is still no connection between the input element and the force transmission unit, this action has no effect on the actuating element. The free or dead travel may thereby be compensated, without the driver noticing it, for example through a corresponding shift of the input element. However, the overridden travel at the output of the brake booster and the deformation of the force transmission element caused by the support force have a direct effect on the size or the width of the air gap. As a function of the ratio of the deformation characteristics (stiffnesses) of the force transmission unit and of the brake master cylinder in conjunction with the braking system, upon the piston of which the output element of the brake booster acts, the generation of the support force results in an enlargement or reduction of the air gap originally set in idle mode. Now, if in idle mode the air gap is correspondingly set to be too small or too large, an air gap, which is exactly as large as needed for implementing the desired jump-in function, results after the generation of the support force and thus after the compensation for undesirable free or dead travel. The air gap thus obtains the dimensions desired at the beginning of the braking operation with the aid of the support force.

In comparison to the complex and expensive implementation of a non-muscular-energy braking system, the design of a brake booster according to the present invention represents a particularly simple and therefore inexpensive variant to the compensation for free or dead travel in braking systems. The brake booster according to the present invention and the operating method according to the present invention are furthermore notable in that dead travel in the area of the brake caliper and also dead travel in the area of the brake master cylinder may be compensated for. In addition, the compensation occurs without the driver's noticing it, thereby ensuring very pleasant driving.

A further advantageous application of the brake booster according to the present invention or of the operating method according to the present invention arises when used in a hybrid or electric vehicle. In such vehicles, the non-muscular-energy mode of the brake booster maybe used during the blending state of a generator torque. When the brake is applied, the pressure is initially built up as part of the compensation for the dead travel. If a generator torque is added, the hydraulic braking torque maybe reduced accordingly, so that the entire braking torque remains constant. In this case brake fluid flows back out of the braking system into the brake m master cylinder, as a result of which the force transmission unit shifts toward the brake actuating element. In a conventional braking system the air gap has to be made sufficiently large so that there is no contact between the force transmission unit and the input element. In a brake booster according to the present invention or with the use of the operating method according to the present invention, on the other hand, the air gap does not have to be enlarged, which means among other factors that in the event of failure of the brake booster there is no increased free travel. Since during the blending stage there is no direct connection between the braking system and the brake actuating element, there is no feedback effect from the brake actuating element, i.e., the feel of the pedal remains constant.

The present invention may be used regardless of the type of brake booster, which means the actuator of the brake booster may be a pneumatic or a hydraulic or an electrohydraulic or an electromechanical or an electrothermal actuator.

Since the force transmission unit and in particular the stiffness of it is unchanged or only slightly changed by comparison with conventional brake boosters, no difference in behavior results even in the event of a failure of the brake booster, and in particular there is no significant increase in the actuating force of the driver to achieve a desired deceleration.

According to one exemplary embodiment of the present invention, the force transmission unit, which may be designed as an elastically deformable reaction disk or an elastic spring construction, is designed in such a way that a deviation of the ratio of the support force to the input force from a predefined ratio results in a deflection of the force transmission unit.

An additional compensation of undesirable free or dead travel in the braking system may be implemented in that the brake booster has a preload unit which acts on the force transmission unit in such a way that it applies a force couple to the force transmission unit in the idle mode of the brake booster. If, prior to a braking intent to be anticipated or immediately after detection of a braking intent, in a time span prior to or immediately after detection of an actuation of the input element, a support force is generated by the actuator; an appropriate design of the preload unit and thus of the force couple and the support force generated prior to a braking intent to be anticipated or immediately after detection of a braking intent makes it possible to override a predefined travel at the output of the brake booster and thus at the piston of the brake master cylinder, without a corresponding travel having to be present at the input of the brake booster and thus at the input element. A free or dead travel may thereby be compensated for, without the driver noticing it, for example through a corresponding shift of the input element. The free travel compensation achieved in this way is then considered accordingly in the interpretation of whether an air gap is "too large" or "too small."

One exemplary embodiment of the present invention which is particularly simple in construction and thus cost-effective results if, on the one hand, the preload unit has a force generation unit, which in idle mode actively applies a first force of the force couple to the force transmission unit, and, on the other hand, a reaction unit which generates a reaction force to the first force, which together with the first force then forms the force couple.

According to one exemplary embodiment of the present invention the force generation unit is designed as a spring element which is preloaded in the idle mode of the brake booster, the spring element resting on one side on the force transmission unit. A return spring of the brake booster or a spring of the master brake cylinder may act as the spring element, for example, which contributes to a further reduction in design complexity and expense.

The reaction force may be generated in a particularly simple manner in that the reaction unit includes a stop, on which the force transmission unit directly or indirectly rests.

Further features and advantages of exemplary embodiments of the present invention are described in the following, with reference to the accompanying drawings.

BRIEF DESCRIPTION OF THE DRAWINGS

FIG. 3 shows a schematic illustration of a second exemplary embodiment of a brake booster according to the present invention.

DETAILED DESCRIPTION

Figure 1:
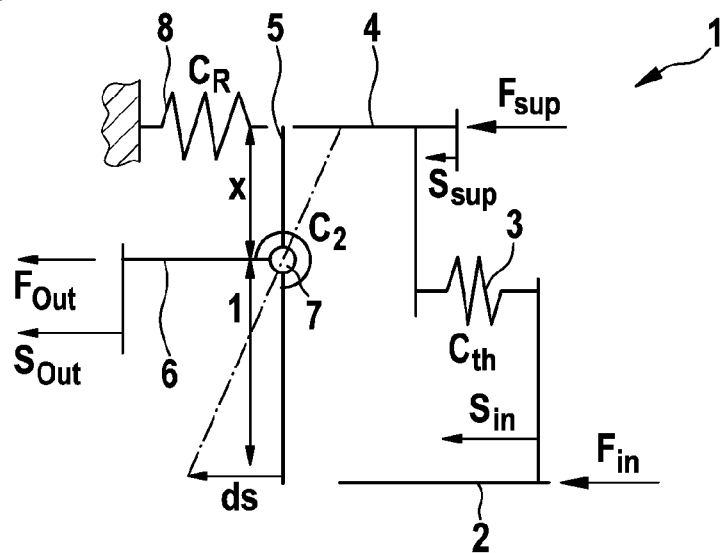
FIG. 1 shows an equivalent diagram of a brake booster according to the present invention.

FIG. 1 shows an equivalent diagram of a brake booster 1 according to the present invention, based on which the mode of operation will also be explained in the following. An input element 2 is mechanically coupled to an actuating element, not shown, which for example may be designed as a brake pedal or a brake lever, and is thus actuatable by a driver. If an input force $F_{in}$, which is greater than a force threshold value, acts on input element 2, which for example may be designed as an input piston, then the latter shifts by a distance $S_{in}$. Here input force $F_{in}$ generally corresponds to an actuating force of the driver. The force threshold value is represented in FIG. 1 in the form of a spring element 3 having a stiffness $c_{th}$ and a spring preload $F_{th}$. An actuator, not shown, may apply a support force $F_{sup}$ to a booster body 4, which results in an adjustment travel $S_{sup}$ of booster body 4. The actuator may be designed in any form, for example pneumatic or hydraulic or electrohydraulic or electromechanical or electrothermal. Booster body 4 may be designed, for example, as a backup piston. Via a force transmission unit 5, which has elastic properties, input force $F_{in}$ and support force $F_{sup}$ are combined into an output force $F_{out}$ and transmitted to an output element 6. Output element 6 shifts here by a distance $S_{out}$. Output element 6 is mechanically coupled to a piston, not shown, of a brake master cylinder, to which a (brake) actuating force maybe applied by the force transmission unit. Force transmission unit 5 is designed in such a way that a deviation of the ratio of the support force $F_{sup}$ to the input force $F_{in}$ from a predefined ratio results in a deflection or deformation of force transmission unit 5. Force transmission unit 5 is thus designed as a force balance, which may be implemented in the form of an elastically deformable reaction disk or an elastic spring construction. From output element 6, a force $F_{TMC}$ acts on the force transmission unit which results from the preload of the springs in the brake master cylinder and, where applicable, from a pre-pressure.

The equivalent diagram of brake booster 1 furthermore contains variables which characterize force transmission unit 5. For example, force transmission unit 5 has a stiffness $C_2$. In addition, a point of contact 7 of output element 6 on force transmission unit 5 is apparent in FIG. 1. A quotient X indicates the ratio of distance x between point of contact 7 and a point of application on booster body 4 as well as the distance between point of contact 7 and a point of application on input element 2 (shown here as length 1). Here the lever lengths, i.e., lengths "x" and "1", correspond, for example, to contact surfaces between input element 2 or booster m body 4 and a reaction disk. If there is a support force $F_{sup}$ and/or an input force $F_{in}$, this may result in a deformation of force transmission unit 5 which is illustrated in FIG. 1 as dash-dot line 5'. This deformation of force transmission unit 5 results in a differential travel ds between the new position of the point of contact of input element 2 and its old position. Moreover, a return spring 8 having a stiffness $c_R$ is provided for force transmission unit 5.

Figure 2:
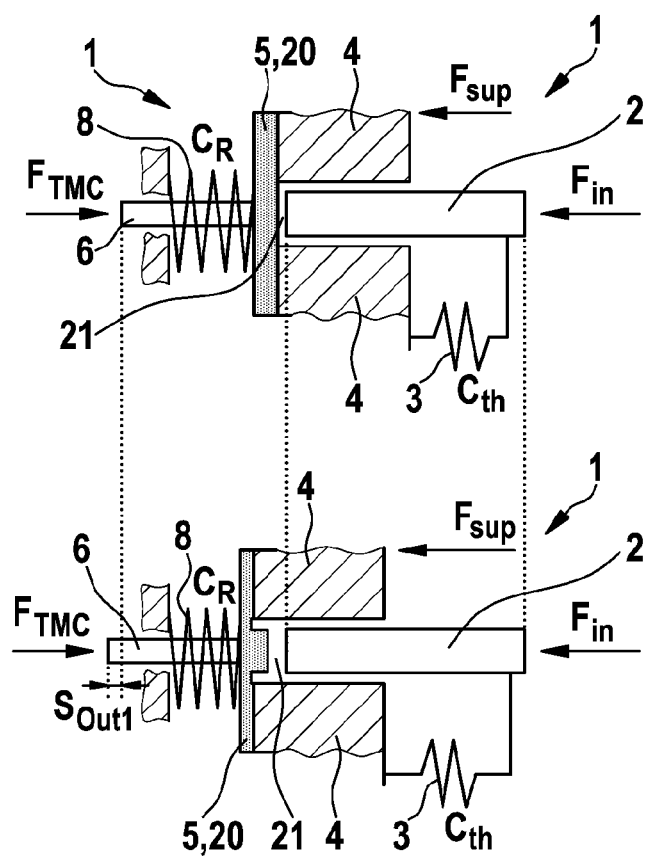
FIG. 2 shows a schematic illustration of a first exemplary embodiment of a brake booster according to the present invention.

One first exemplary embodiment of a brake booster 1 according to the present invention and according to the equivalent diagram from FIG. 1 is illustrated in FIG. 2.

The top part of FIG. 2 illustrates brake booster 1 in the idle mode of the braking system. An air gap 21 is recognizable between force transmission unit 5, which is designed as a reaction disk 20 in the illustrated exemplary embodiment, and input element 2. Such an air gap 21 is used to implement a so-called jump-in function and must first be overridden before input element 2 applies input force $F_{in}$ to reaction disk 20.

In particular during the use of so-called zero drag calipers or also as a result of system design, undesirable free or dead travel may occur in the area of the braking system. In order to compensate for these, a support force $F_{sup}$ is generated by the actuator (not illustrated) prior to a braking intent to be anticipated or immediately after detection of a braking intent, in a time span before or immediately after detection of an actuation of input element 2. On the one hand, output element 6 is thus shifted in the direction of the brake master cylinder, whereby an output travel $S_{out1}$ is overridden. On the other hand, reaction disk 20, as shown in the bottom part of FIG. 2, is also deformed. Since there is still no connection between input element 2 and reaction disk 20, this shift and deformation, however, do not have any influence on the actuating element (ignoring spring element 3) and consequently remain unnoticed by the driver.

However, overridden output travel $S_{out1}$ and the deformation of reaction disk 20 have a direct effect on the dimensions of air gap 21. In the illustrated exemplary embodiment, overridden output travel $S_{out1}$ is greater than the deformation of reaction disk 20 pointing in the opposite direction. For this reason, air gap 21 is larger after the application of support force $F_{sup}$, prior to a braking intent to be anticipated or immediately after detection of a braking intent (FIG. 2 bottom), than air gap 21 in idle mode (FIG. 2 top).

The situation illustrated in the bottom part of FIG. 2 represents the initial situation at the beginning of the actual braking operation. Here, the desired jump-in function should take effect, i.e., air gap 21 should have exactly the desired dimensions in this operating situation. In order to implement this, air gap 21 in idle mode has to be set smaller than the desired air gap at the beginning of a braking operation. Support force $F_{sup}$ used to compensate for the undesirable free or dead travel is thus used to obtain the desired dimensions of air gap 21 prior to a braking intent to be anticipated or immediately after detection of a braking intent.

In another implementation of the individual components of the braking system, support force $F_{sup}$ may also result in a reduction of air gap 21, prior to a braking intent to be anticipated or immediately after detection of a braking intent, in contrast to the illustrated variant. In this case, air gap 21 in idle mode has to be set correspondingly larger than the desired air gap at the beginning of a braking operation.

As an alternative to the illustrated exemplary embodiment, input element 2 may also be split and have a first subcomponent which is actuatable by the driver for generating the input force and, separate from it, a second subcomponent for transmitting the input force to the force transmission unit. In this case, air gap 21 may also be provided between the first subcomponent and the second subcomponent of the input element without any effect on the applicability of the present invention.

FIG. 3 shows another exemplary embodiment of the present invention. Here input element 2 is split and has a first subcomponent 30 which is actuatable by the driver for generating the input force $F_{in}$ and, separate from it, a second subcomponent 31 for transmitting input force $F_{in}$ to force transmission unit 5 which is implemented as reaction disk 20. In the idle mode of the braking system, which is illustrated in the top part of FIG. 3, return spring 8 of brake booster 1, which in this case serves as a force generation unit, rests via reaction disk 20 on second subcomponent 31 of input element 2. The side of second subcomponent 31 facing away from reaction disk 20 rests, in turn, on a stop 32, which in the case of this exemplary embodiment serves as a part of a reaction unit. A first force is thus actively applied to reaction disk 20 on the one hand via the preloaded return spring 8. This first force results via second subcomponent 31 and stop 32 in a reaction force acting in the opposite direction, which also acts on reaction disk 20. In this way, a force couple is applied to reaction disk 20, which results in the depicted deformation of reaction disk 20. The force generation unit thus forms, together with the reaction unit, a preload unit which acts on force transmission unit 5 in such a way that a force couple is applied to it in the idle mode of brake booster 1. As an alternative to the illustrated exemplary embodiment, the first force of the force couple may also be generated by another spring element such as a spring of the brake master cylinder. The first force may also be generated in a different manner, e.g., with the aid of an electric motor. Likewise, it is conceivable that the second force of the force couple is not generated as a reaction force, but also as an active force with the aid of an electric motor, for example.

An air gap 21', which is used to implement a jump-in function similarly to the exemplary embodiment according to FIG. 2, is provided between first subcomponent 30 and second subcomponent 31 of input element 2.

If prior to a braking intent to be anticipated or immediately after detection of a braking intent in a time span before or immediately after detection of an actuation of input element 2, a support force $F_{sup}$ is generated by the actuator, not shown, then on the one hand output element 6 is shifted in the direction of the brake master cylinder. On the other hand, reaction disk 20, as shown in the central part of FIG. 3, is also deformed. This results in the situation that an output travel $S_{out}$ of output element 6 is overridden; the two subcomponents 30 and 31 of input element 2, however, remain precisely in their position until a contact force between input element 2 and reaction disk 20 (with loose coupling of second subcomponent 31 to reaction disk 20) or between input element 2 and stop 32 (with fixed coupling of second subcomponent 31 to reaction disk 20) is equal to zero. If support force $F_{sup}$ is increased further, then air gap 21' between first subcomponent 30 and second subcomponent 31 of input element 2 (cf. FIG. 3 bottom) increases, if second subcomponent 31 is fixedly coupled to reaction disk 20. In the case of loose coupling (not illustrated) of second subcomponent 31 of input element 2 to reaction disk 20, a further increase of support force $F_{sup}$ results in an additional air gap between reaction disk 20 and second subcomponent 31 of input element 2 and/or in an enlargement of air gap 21'. Both the enlargement of air gap 21' and the formation of an additional air gap between reaction disk 20 and second subcomponent 31 of input element 2 would have the result, however, if no further measures were taken, that the total air gap would become too large for implementing the desired jump-in function. Similarly to the exemplary embodiment according to FIG. 2, this effect is compensated for in that air gap 21' in the idle mode, which is, for example, set during the manufacture of brake booster 1, is smaller than a desired air gap at the beginning of a braking operation. In this exemplary embodiment, a further increase in support force $F_{sup}$ may also result in a reduction of originally set air gap 21' as a function of the ratio of the deformation characteristics (stiffness) of force transmission unit 5 and of the brake master cylinder, upon the piston of which output element 6 acts, and in conjunction with the braking system. In this case, in order to compensate for this effect, air gap 21' in the idle mode has to be set correspondingly larger than a desired air gap at the beginning of a braking operation, similarly to the exemplary embodiment according to FIG. 2.

Brake booster 1 is thereby in a position, prior to a braking intent to be anticipated or immediately after detection of a braking intent, to override an output travel $S_{out}$ without any feedback effect on first subcomponent 30 of input element 2 and is thus unnoticeable by the driver. This may be utilized in order to compensate for undesirable dead or free travel in the braking system. The change in the dimensions of air gap 21' thus resulting is compensated for by the appropriate reduction or enlargement of air gap 21' in idle mode.

As already mentioned, according to the present invention a support force $F_{sup}$ is generated prior to a braking intent to be anticipated or immediately after detection of a braking intent in a time span before or immediately after detection of an actuation of input element 2. The precise point in time may be set in a variety of ways. For example, a release of the accelerator pedal or an activation of a brake light switch, or even detection of a drag torque, may be interpreted as indications for a shortly to be anticipated actuation of input element 2 of the brake booster and may thus be used as a trigger for the successive increase in support force $F_{sup}$.

As an alternative to the exemplary embodiment shown in FIG. 3, input element 2 may also be situated movably in a tube, which in the idle mode of brake booster 1 is in contact with force transmission unit 5 and rests with its side facing away from force transmission unit 5 on stop 32. In this case, the reaction force is generated via the tube in cooperation with stop 32. Naturally, to force transmission unit 5, i.e., for example reaction disk 20, may also rest directly on stop 32 without any effect on the applicability of the present invention due to appropriate structural design of brake booster 1.

What is claimed is:

1. A brake booster, comprising:
   an input element which is actuatable by a driver,
   an actuator for generating a support force,
   an output element, to which an input force or the support force may be applied by the input element and/or the actuator and via which an actuating force may be applied to a piston of a brake master cylinder, and
   a force transmission unit having elastic properties, which is situated between the input element and the actuator on one end and the output element on an other end and which transmits the input force and/or the support force to the output element,
   wherein a target air gap corresponding to a desired air gap at a beginning of a braking operation is provided between the input element and the force transmission element by actuation of the actuator to generate the support force one of (i) prior to a braking intent to be anticipated or (ii) immediately after detection of a braking intent by the driver, wherein an air gap between the input element and the force transmission element in idle mode is one of smaller or larger than the target air gap corresponding to the desired air gap at the beginning of the braking operation, wherein the support force is generated independently of a movement of the input element, wherein the brake booster has a preload unit, which acts on the force transmission unit such that it applies a force couple to the force transmission unit when the brake booster is in the idle mode.

2. The brake booster as recited in claim 1, the preload unit including:
   a force generation unit which actively applies a first force of the force couple to the force transmission unit, and
   a reaction unit which generates a reaction force to the first force which together with the first force forms the force couple.

3. The brake booster as recited in claim 2, wherein the force generation unit in the idle mode of the brake booster is configured as a preloaded spring element which rests with one side on the force transmission unit.

4. The brake booster as recited in claim 2, wherein the reaction unit includes a stop, on which the force transmission unit directly or indirectly rests.

\* \* \* \* \*